UNITED STATES PATENT OFFICE.

FRANK S. YOUNG, OF NORRISTOWN, PENNSYLVANIA.

METHOD OF MAKING MAGNESIUM CARBONATE.

SPECIFICATION forming part of Letters Patent No. 689,345, dated December 17, 1901.

Application filed July 13, 1901. Serial No. 68,262. (No specimens.)

*To all whom it may concern:*

Be it known that I, FRANK S. YOUNG, a citizen of the United States, residing at the borough of Norristown, in the county of Montgomery and State of Pennsylvania, have invented certain new and useful Improvements in Producing Magnesium Carbonate; and I do hereby declare that the following is a full, clear, and exact description of the invention, which will enable others skilled in the art to which it appertains to use the same.

The process hitherto used for the manufacture of magnesium carbonate has been to form by any suitable method a solution of bicarbonate of magnesium. The clear solution of the magnesium bicarbonate is next heated to a suitable temperature, by which means the said bicarbonate is decomposed, forming an insoluble carbonate of magnesium of variable composition and free carbonic-acid gas, which is evolved. The carbonate of magnesium thus precipitated is normally light and bulky and has a composition varying from $3MgO.3CO_2.3H_2O$ to $4MgO.3CO_2.4H_2O$. To produce a heavy carbonate of magnesium by this process it is necessary to compress the light carbonate thus obtained under high pressure.

The object of the present invention is to produce by precipitation either the light or heavy carbonate of magnesium, as may be desired, thus avoiding the necessity of compressing the precipitated carbonate in order to obtain the heavy carbonate of the said metal; secondly, to lessen the cost of production by using a crude product. The quantity produced by this method is more than double that produced by boiling alone, and the amount of heat required is less.

To this end my invention consists in mixing with a filtered solution of the bicarbonate of magnesium a quantity of calcined magnesite sufficient to combine with the bicarbonate to form an insoluble carbonate having the desired composition. The proportion of calcined magnesite added and the temperature to which the mixture is heated depend upon the nature of the product it is desired to produce. The temperature of the bicarbonate solution at the time the calcined magnesite is added has a marked effect upon the physical character of the precipitated carbonate.

If I desire to produce a light carbonate similar to the light carbonate of magnesia of commerce, I heat the solution of the bicarbonate to a temperature of about 150° Fahrenheit and add a quantity of calcined magnesite sufficient to form with the bicarbonate a compound approximating the composition $3MgO.2CO_2.3H_2O$, agitate the mixture, and heat to ebullition. If I desire to produce a heavy carbonate of magnesium similar to the heavy carbonate of magnesium of commerce, I first heat the bicarbonate solution to a temperature of 150° Fahrenheit, add sufficient calcined magnesite to form with the bicarbonate a compound approximating to the composition $4MgO.3CO_2.4H_2O$, and agitate the mixture. To produce a heavy crystalline product, I add to the cold solution of the bicarbonate sufficient calcined magnesite to form with the bicarbonate a compound approximating to the composition of the normal carbonate of magnesium—viz., $MgO.CO_2$—agitate the mixture, and heat to about 165° Fahrenheit.

It will be seen from the above description that this process of precipitating magnesium carbonate permits of an almost perfect control of the chemical and physical character of the compound produced, whereas in the method of precipitating by boiling alone there is practically no control over the composition and physical character of the compound produced. The application of my method will permit, at a comparatively small expense, of doubling the capacity of a plant using the old method of precipitation.

Calcined magnesite is the cheapest product that can be used. It will produce a compound equal in appearance and physical character to that made with pure magnesium oxid, requires no refining, and consequently admits of the production of a commercial product at a cost that will allow its use for manufacturing purposes for heat and sound insulating articles.

The amount of heat required in the operation is much less than in the old method, since the chemical reaction I use is a heat-producing one, while the one made use of in the old method is a heat-absorbing reaction.

Having thus described my invention, what I claim as new therein, and desire to secure by Letters Patent, is—

1. The herein-described process of producing magnesium carbonate, which consists in adding calcined magnesite to a solution of the bicarbonate of the said metal, agitating and heating the mixture, substantially as described.

2. The herein-described process of producing magnesium carbonate, which consists in adding to a solution of the bicarbonate of the said metal sufficient oxid of magnesium to form with the bicarbonate a compound of the composition desired, agitating and heating the mixture, substantially as described.

3. The herein-described process of producing magnesium carbonate, which consists in adding to a solution of the bicarbonate of the said metal, sufficient calcined magnesite to form with the bicarbonate a compound of the composition desired, agitating and heating the mixture, substantially as described.

4. The herein-described process of producing a light carbonate of magnesium, which consists in adding to a solution of the bicarbonate of the said metal oxid of magnesium, agitating the mixture and heating to a temperature of 200° Fahrenheit or above, substantially as described.

5. The herein-described process of producing a light carbonate of magnesium, which consists in adding to a solution of the bicarbonate of the said metal calcined magnesite, agitating the mixture and heating to a temperature of 200° Fahrenheit or above, substantially as described.

6. The herein-described process of producing a light carbonate of magnesium, which consists in adding to a solution of the bicarbonate of the said metal sufficient oxid of magnesium to form with the bicarbonate a compound approximating to the composition, $3MgO.2CO_2.3H_2O$, agitating and heating the mixture to a temperature of 200° Fahrenheit or above, substantially as described.

7. The herein-described process of producing a light carbonate of magnesium, which consists in adding to a solution of the bicarbonate of the said metal sufficient calcined magnesite to form with the bicarbonate a compound approximating to the composition, $3MgO.2CO_2.3H_2O$, agitating the mixture and heating to a temperature of 200° Fahrenheit or above, substantially as described.

FRANK S. YOUNG.

Witnesses:
W. W. UBERROTH,
W. GRANT LESSIG.